C. H. PEASE.
LICENSE TAG BRACKET.
APPLICATION FILED SEPT. 18, 1919.

1,329,206.

Patented Jan. 27, 1920.

WITNESSES
Bernard Aebly
S. W. Foster

INVENTOR
C. H. Pease
BY
Munn & Co.
ATTORNEYS

UNITED STATES PATENT OFFICE.

CHARLES H. PEASE, OF CANAAN, CONNECTICUT.

LICENSE-TAG BRACKET.

1,329,206.      Specification of Letters Patent.      Patented Jan. 27, 1920.

Application filed September 18, 1919. Serial No. 324,466.

*To all whom it may concern:*

Be it known that I, CHARLES H. PEASE, a citizen of the United States, and a resident of Canaan, in the county of Litchfield and State of Connecticut, have invented a new and Improved License-Tag Bracket, of which the following is a full, clear, and exact description.

This invention relates to improvements in license tag brackets, an object of the invention being to provide a bracket which is adapted to be secured to the dashboard of an automobile and rigidly secure the license tag in such position that it can be conveniently seen and yet be entirely out of the way and not liable to be broken or bent by contact with another object.

A further object is to provide a bracket of the character stated which can be manufactured and sold at an extremely low price, which can be attached to an automobile without marring the same, which can be placed in position by anyone of average intelligence, not requiring skilled labor, and which will be strong and durable in use.

With these and other objects in view the invention consists in certain novel features of construction, and combinations and arrangements of parts, as will be more fully hereinafter described and pointed out in the claim.

In the accompanying drawings—

Figure 1:
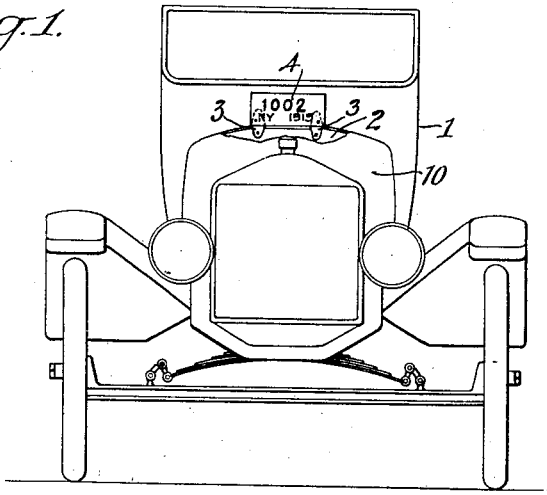
Figure 1 is a view in front elevation of an automobile partly broken away illustrating my improvements.

1 represents an automobile having the ordinary dashboard 2, and 3, 3, are my improved brackets which are preferably of sheet metal and which are adapted to be secured to the dashboard and support the license tag 4, as will now be explained. The brackets are used in pairs and the description of one will, of course, apply alike to both.

Each bracket 3 has at one end a straight vertical portion 5 adapted to rest against the front face of the dashboard 2. At the upper end of the straight portion 5 the bracket is bent at a sharp right angle forming a horizontal portion 6 resting on the upper edge of the dashboard 2. The bracket then curves upwardly and rearwardly, as shown at 7, and is positioned above the cowl 15 of the car. At the rear end of the curved portion 7 the bracket extends upwardly and vertically, as shown at 8, and rests against the rear face of the license tag 4.

The vertical portion 5 and horizontal portion 6 are provided with perforations 9 and 10 respectively for the reception of screws 11 screwed into the dashboard 2 to securely hold the bracket thereon. The vertical portion 8 of the bracket is provided with a pair of perforations 12 adapted to receive bolts 13 securing the license tag 4 to the bracket.

Figure 2:
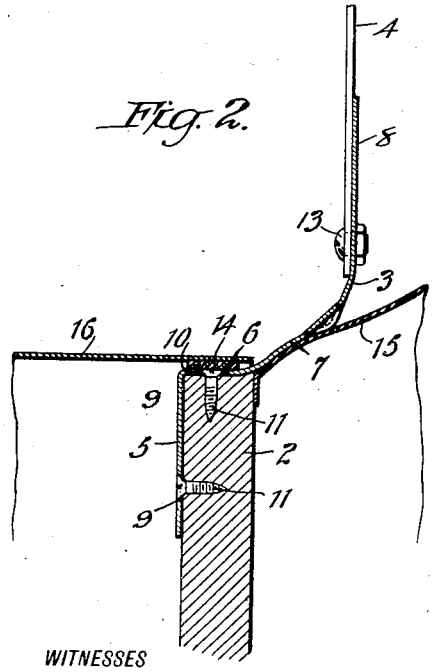
Fig. 2 is a fragmentary view in vertical longitudinal section on an enlarged scale.
Figure 3:
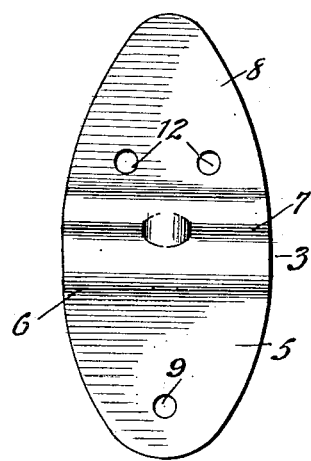
Fig. 3 is a view in front elevation of one of the brackets.

As shown clearly in Fig. 2, the bracket extends under the felt 14 which cushions the hood 16 and the bracket can be conveniently located without disturbing any of the parts of the automobile. Furthermore, it can be secured by the use of an ordinary screwdriver and does not require special tools for its attachment.

This location of the license tag I believe to be the best possible location as it is out of the way and does not interfere in any way with the other parts of the car and is not liable to be broken or bent by contact with another object.

Various slight changes may be made in the general form and arrangement of parts described without departing from the invention, and hence I do not limit myself to the precise details set forth but consider myself at liberty to make such changes and alterations as fairly fall within the spirit and scope of the appended claim.

I claim:

The combination with an automobile having a dashboard, of a pair of brackets having straight portions positioned against the front faces of the dashboard, horizontal portions extending over the upper edge of the dashboard, said vertical and horizontal portions having perforations therein, securing devices in said perforations and projecting into the dashboard, said brackets having upwardly and rearwardly projecting portions positioned over the cowl of the automobile, and vertical portions at the upper ends of the brackets having perforations therein for the reception of securing devices connecting the license tag thereto.

CHARLES H. PEASE.